United States Patent
Dodge et al.

(10) Patent No.: US 9,772,010 B2
(45) Date of Patent: Sep. 26, 2017

(54) BUILDING CLOSURE OPERATOR

(71) Applicant: Milgard Manufacturing Incorporated, Tacoma, WA (US)

(72) Inventors: Travis James Dodge, Tacoma, WA (US); Michael Barton, Orting, WA (US); Eric Baczuk, Puyallup, WA (US)

(73) Assignee: Milgard Manufacturing Incorporation, Tacoma, WA (US)

( * ) Notice: Subject to any disclaimer, the term of this patent is extended or adjusted under 35 U.S.C. 154(b) by 0 days.

(21) Appl. No.: 15/181,481

(22) Filed: Jun. 14, 2016

(65) Prior Publication Data
US 2016/0369549 A1   Dec. 22, 2016

Related U.S. Application Data

(60) Provisional application No. 62/182,018, filed on Jun. 19, 2015.

(51) Int. Cl.
| | | |
|---|---|---|
| *E05D 15/28* | (2006.01) | |
| *F16H 19/00* | (2006.01) | |
| *E05F 11/10* | (2006.01) | |
| *E05F 11/16* | (2006.01) | |

(52) U.S. Cl.
CPC ............ *F16H 19/001* (2013.01); *E05F 11/10* (2013.01); *E05F 11/16* (2013.01); *E05Y 2201/218* (2013.01); *E05Y 2800/75* (2013.01); *E05Y 2900/148* (2013.01); *F16H 2019/008* (2013.01)

(58) Field of Classification Search
CPC ... E05F 11/24; E05F 11/10; E05F 3/00; F16H 19/001; E05Y 2900/148

USPC ............... 49/246, 339, 341, 342, 141
See application file for complete search history.

(56) References Cited

U.S. PATENT DOCUMENTS

| | | | | |
|---|---|---|---|---|
| 1,924,557 | A * | 8/1933 | Johnson | E05C 17/24 |
| | | | | 49/341 |
| 2,576,536 | A * | 11/1951 | Reynaud | E05F 11/14 |
| | | | | 49/342 |
| 4,937,976 | A * | 7/1990 | Tucker | E05F 11/06 |
| | | | | 49/252 |
| 5,509,234 | A | 4/1996 | Klimek et al. | |
| 5,802,768 | A * | 9/1998 | Hammer | E05F 15/619 |
| | | | | 403/345 |
| 8,418,404 | B2 * | 4/2013 | Gramstad | E05C 17/24 |
| | | | | 49/141 |

(Continued)

FOREIGN PATENT DOCUMENTS

GB      2504162 A *  1/2014  ............ E05F 11/24

*Primary Examiner* — Jerry Redman
(74) *Attorney, Agent, or Firm* — Reising Ethington, P.C.

(57) ABSTRACT

A building closure operator includes an operator arm pivotable about an arm axis from an arm closed position to an arm open position, an arm lock actuatable to lock the arm in different locked positions and releasable to release the arm, and an articulatable lever pivotable about a lever axis parallel to the arm axis, from a lever home position corresponding to the arm closed position, to a lever actuated position corresponding to the arm open position. The lever includes a lever coupling maintainable in the lever actuated position, and a lever handle pivotable with respect to the lever coupling back to the home position to actuate the arm lock to lock the arm in one of the different locked positions.

20 Claims, 8 Drawing Sheets

(56) References Cited

U.S. PATENT DOCUMENTS

| | | | |
|---|---|---|---|
| 8,490,330 B2* | 7/2013 | Lund | E05C 17/30 |
| | | | 292/1 |
| 8,726,572 B2* | 5/2014 | Derham | E05C 19/003 |
| | | | 49/141 |
| 9,273,763 B2* | 3/2016 | Evensen | F16H 21/44 |
| 2002/0066162 A1* | 6/2002 | Klompenburg | E05F 11/16 |
| | | | 16/429 |
| 2012/0174487 A1* | 7/2012 | Lambertini | E05F 11/16 |
| | | | 49/353 |
| 2015/0013230 A1* | 1/2015 | Balbo Di Vinadio | E05D 15/44 |
| | | | 49/359 |

* cited by examiner

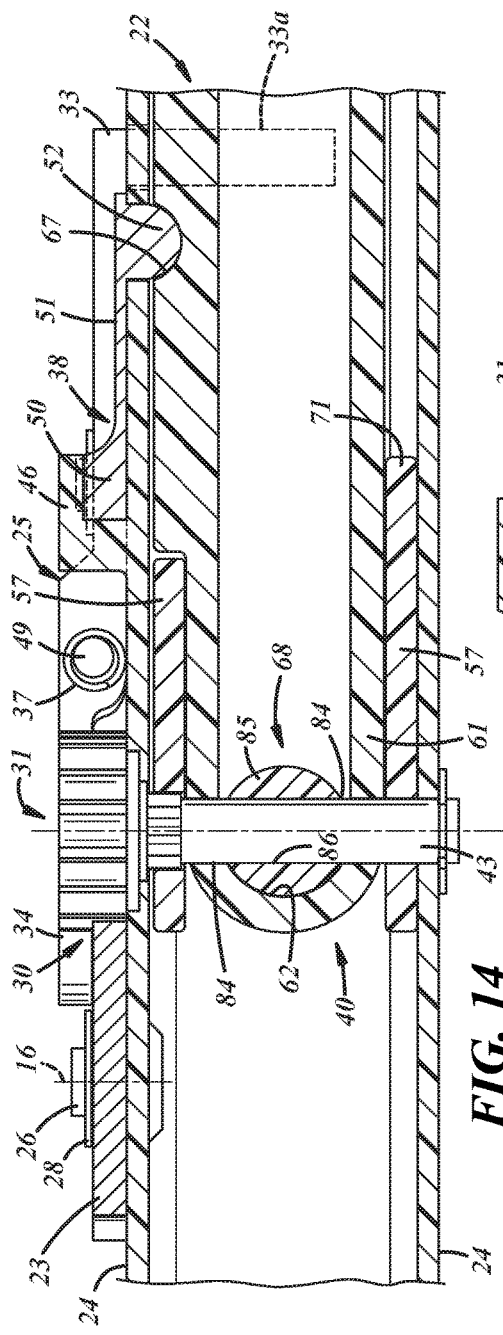
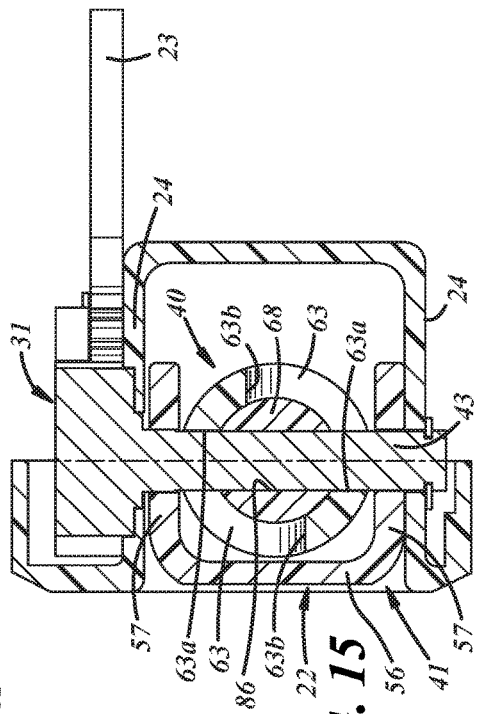
FIG. 14
FIG. 15

BUILDING CLOSURE OPERATOR

TECHNICAL FIELD

This disclosure relates generally to building closures and, more particularly, to open and close operators for movable closures.

BACKGROUND

Pivotable closures for buildings, for example, casement windows, may include a sash that can be opened and closed using push/pull handles, rotary cranks, simple lever arms, or other conventional building closure operators. Such conventional devices may render the sash susceptible to violent closing or opening events from sudden wind gusts. Also, some such devices may project into a building interior so as to interfere to an unacceptable degree with blinds, curtains, or other window dressings.

BRIEF DESCRIPTION OF THE DRAWINGS

FIG. 14 is an enlarged, fragmentary, cross-sectional view of a portion of the building closure operator of FIG. 1, taken along the longitudinal axis of the lever, and taken through an articulation coupling of the lever through which a shaft of the input gear extends and including the lever coupling, a barrel of the lever handle extending into the lever coupling, and a spherical bearing in the barrel; and FIG. 15 is an enlarged, fragmentary, cross-sectional view of a portion of the building closure operator of FIG. 1, taken perpendicularly with respect to the longitudinal axis of the lever, and taken through the articulation coupling, and illustrating slot ends.

DETAILED DESCRIPTION

In general, a building closure operator will be described using one or more examples of illustrative embodiments of a window that includes a frame, a pivotable closure pivotably coupled to the frame, and a building closure operator. The example embodiment(s) will be described with reference to use with a sash window. But it will be appreciated as the description proceeds that the building closure operator is useful in many different applications and may be implemented in many other embodiments including awning windows, and other movable building closures.

Figure 1:
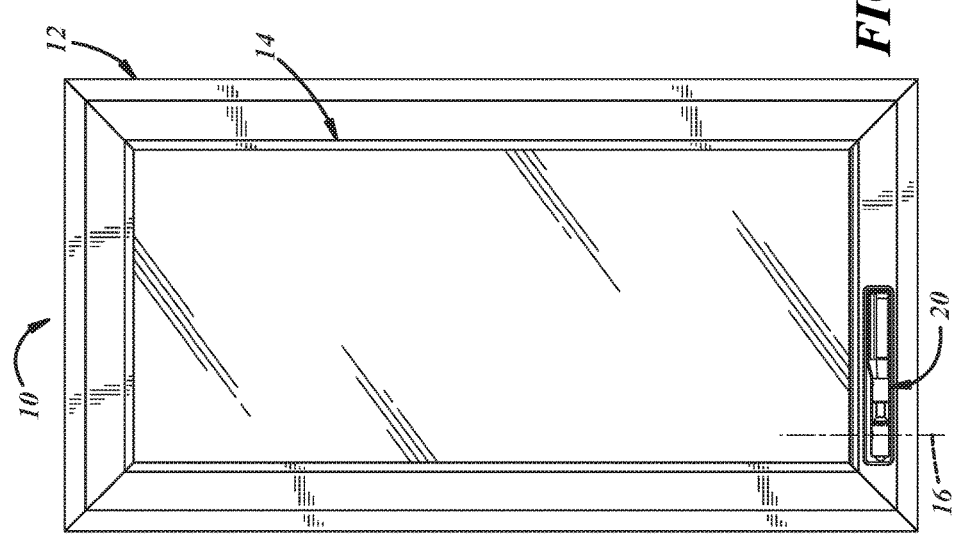
FIG. 1 is a front elevational view according to an illustrative embodiment of a window including a frame, a pivotable closure, and a building closure operator carried by the frame and coupled to the closure.

Referring specifically to the drawings, an illustrative embodiment of a window 10 is shown in FIG. 1 and includes a frame 12, a pivotable closure 14 that may be pivotable about a closure pivot axis 16, and a building closure operator 20 that may be carried by the frame 12 and that is operatively coupled to the closure 14 to open and close and otherwise move the closure 14. As will be described in greater detail below, the operator 20 includes novel components and novel arrangements of components that may solve one or more problems with conventional building closure operators.

Figure 2:
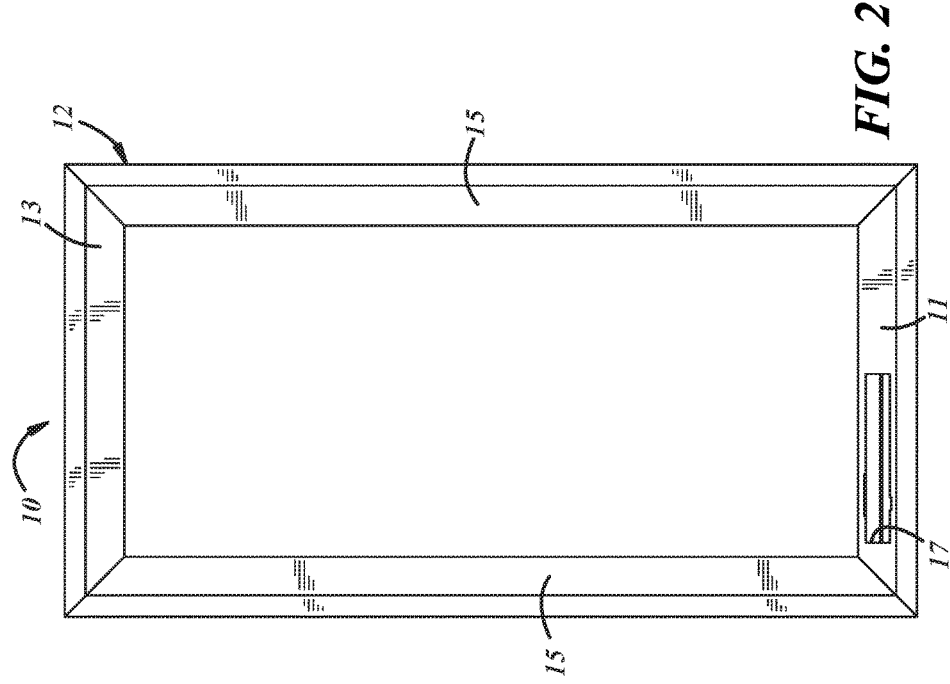
FIG. 2 is a front elevational view of the frame of FIG. 1, illustrating a recess for the operator of FIG. 1.

With reference to FIG. 2, the frame 12 may include a sill 11, a header 13, jambs 15 extending vertically therebetween, and a recess 17 to carry the operator 20. In the illustrated embodiment, the sill 11 may include the recess 17, but other portions of the frame 12, particularly the header 13, may include the recess 17 to carry the operator 20.

Figure 3:
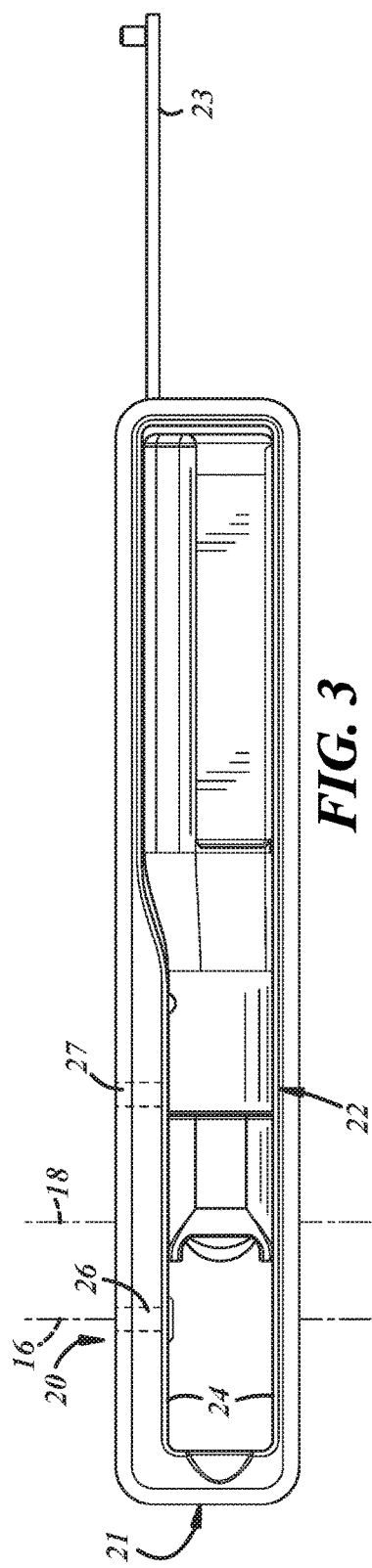
FIG. 3 is an enlarged front elevational view of the building closure operator of FIG. 1, illustrating an operator housing, an articulatable lever carried in the housing, and a portion of an operator arm extending behind the housing.

With reference to FIG. 3, the operator 20 may include an operator housing 21 that may be carried in the frame recess 17 (FIG. 2) and may be coupled to the frame 12 (FIG. 2) by integral construction, interference fit, snap fit, adhesion, fastening, and/or in any other suitable manner. In any case, the operator 20 includes an articulatable lever 22 that may be carried in the housing 21, and an operator arm 23 operatively coupled to the lever 22, for example, as described herein below. The arm 23 is pivotable about an arm pivot axis that may be parallel to, and even coaxial with, the closure pivot axis 16, and the lever 22 is pivotable about a lever pivot axis 18 that may be parallel to the arm/closure pivot axes 16. In the illustrated embodiment, the lever pivot axis 18 is laterally offset from the arm pivot axis 16, but could be coaxial therewith in other embodiments, which, for instance, could include a geartrain 30 to accommodate such an arrangement. In any event, the housing 21 may include opposed walls 24 spaced apart in a direction along the arm pivot axis 16, wherein the articulatable lever 22 may be pivotably mounted internally between the opposed walls 24, and the operator arm 23 and the arm lock 25 may be carried externally by one of the opposed walls 24. The arm 23 may be pivotably carried by one of the walls 24 of the housing 21, for example, via a headed shaft 26 and clip 28, for instance.

Figure 4:
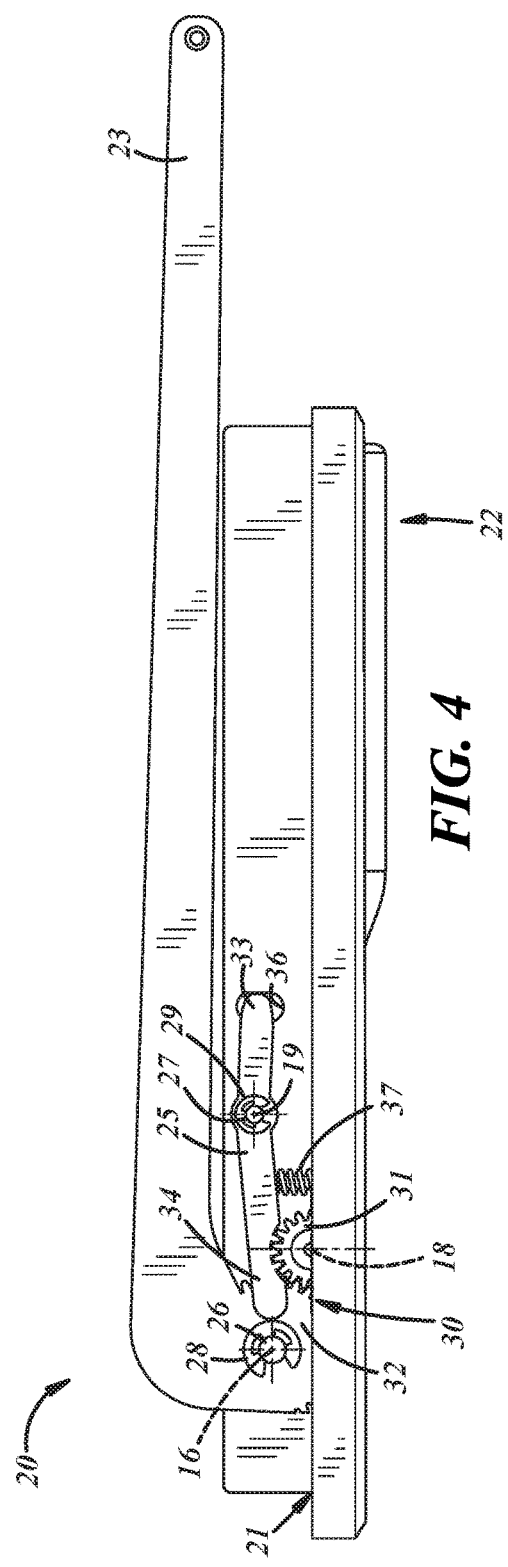
FIG. 4 is a top view of the building closure operator of FIG. 1, illustrating an operator arm in a closed position and a lever in a home position, and further illustrating a geartrain, an arm lock engaged with an input gear of the geartrain to lock the operator arm in the closed position, a spring to apply a bias force against the arm lock, and a detent to releasably restrain the lever in the home position.

With reference to FIG. 4, the operator arm 23 is illustrated in a closed position and the articulatable lever 22 is illustrated in a home position. The operator 20 also may include the geartrain 30 operatively coupled between the lever 22 and the arm 23, and that may include an input gear 31 rotationally fixed to the lever 22 and an output gear 32 rotationally fixed to the arm 23, for instance, by being an integral portion of the arm 23. The geartrain 30 may include different gears than those shown, and/or other gears in addition to those shown. The geartrain 30 may be used to convey lever torque to the arm 23 from input torque applied to the lever 22, and also may be used to multiply such lever torque, for instance, via different gear sizes.

The operator 20 further may include an arm lock 25 to lock the operator arm 23 in the closed position. For example, the arm lock 25 may be engageable with the geartrain 30 to lock the arm 23 in different locked positions and may be disengageable from the geartrain 30 to release the arm 23. More specifically, the arm lock 25 may engage the geartrain 30 at the input gear 31. Also, the arm lock 25 may include an actuator end 33 to cooperate with the lever 22, an oppositely disposed lock end 34 to engage the geartrain 30, and a pivot axis 19 therebetween about which the arm lock 25 is pivotable. Accordingly, the arm lock 25 may be a double-ended lever. The arm lock 25 may be pivotably carried by one of the walls 24 of the housing 21, for example, via a headed shaft 27 and clip 29, for instance, per the illustrated embodiment. The actuator end 33 may include a portion 33a (FIG. 9) extending through a corresponding aperture 36 in the housing wall 24 and into the recess 17 (FIG. 2) in which the lever 22 is carried for cooperation with the lever 22.

The operator 20 additionally may include a spring 37 to apply a bias force against the arm lock 25 to bias the arm lock 25 toward a released or disengaged position with respect to the geartrain 30. The spring 37 may be disposed between a portion of the housing 21 and the arm lock 25. The spring 37 may include a coiled compression spring, as illustrated, a bent strip or plate, an elastomeric member, or any other suitable spring to impose a bias force on the arm lock 25.

Figure 5:
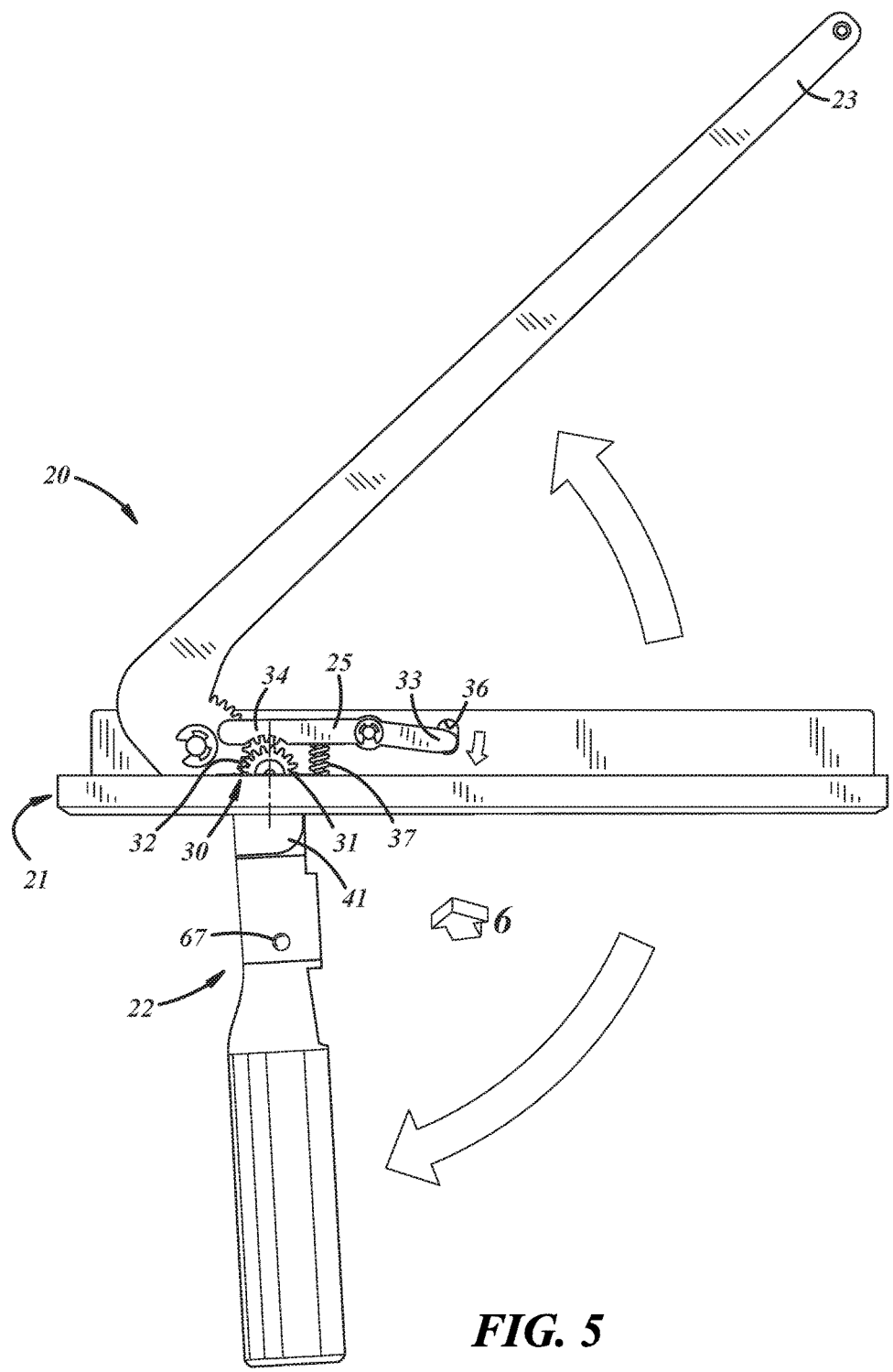
FIG. 5 is a top view of the building closure operator of FIG. 1, illustrating the operator arm in an open position and the lever in an actuated position with the arm lock biased by the spring to an unlocked or disengaged position with respect to the input gear of the geartrain.

With reference to FIG. 5, the operator arm 23 is illustrated in an open position and the lever 22 is illustrated in an actuated position after the arm 23 has been moved out of the housing recess 17 against the releasable restraint force offered by the detent 38.

Figure 6A:
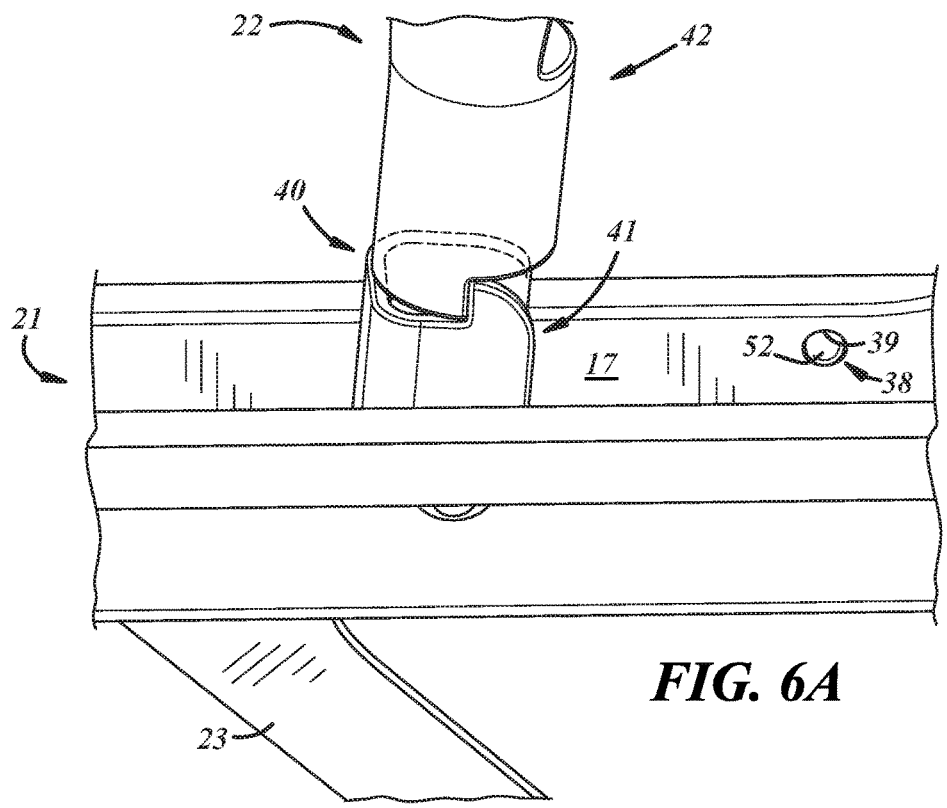
FIG. 6A is an enlarged, fragmentary, lower perspective view of the building closure operator of FIG. 1, taken from perspective arrow 6 of FIG. 5, illustrating the operator arm in the open position and the lever in the actuated position.

With reference to FIG. 6A, the lever 22 includes an articulation coupling 40, which may include a lever coupling 41 that may be pivotably mounted to the housing 21, and a lever handle 42 pivotable with respect to the lever coupling 41 back to the home position.

Figure 6B:
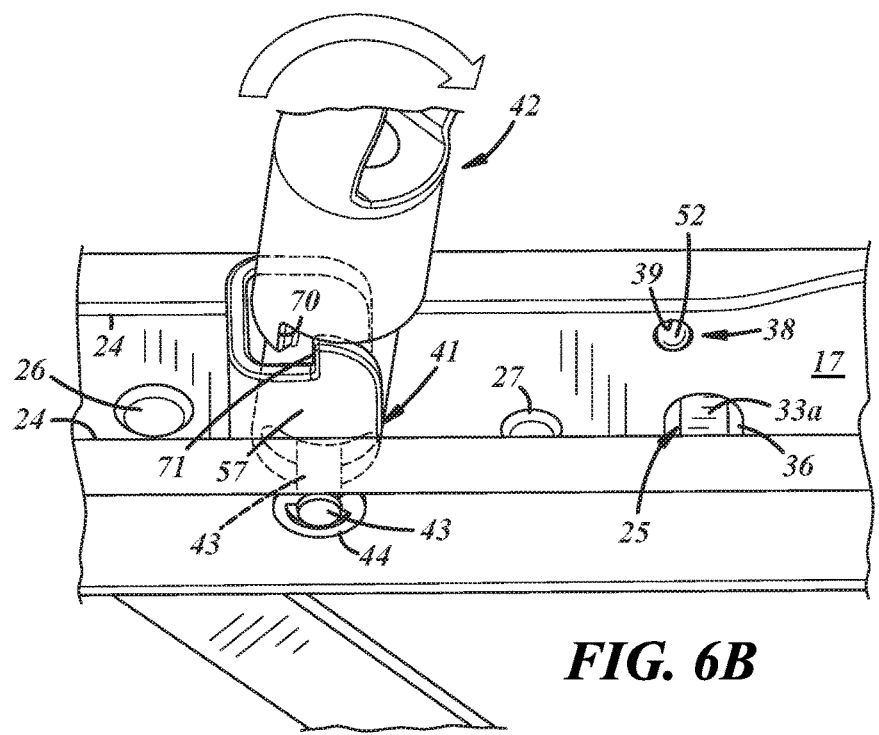
FIG. 6B is an enlarged, fragmentary, lower perspective view of the building closure operator of FIG. 1, taken from perspective arrow 6 of FIG. 5, but illustrating a lever handle being rotated about its longitudinal axis with respect to a lever coupling that is pivotably mounted to the operator housing.

With reference to FIG. 6B, for instance, the lever handle 42 may be rotatable about its longitudinal axis with respect to the lever coupling 41 so as to disengage a portion of the handle 42 from the coupling 41 to facilitate folding of the lever 22. As used herein, the term articulation includes movement that is some combination of pivoting motion, rotating motion, and/or translating motion. In FIG. 6B, it can be seen that the input gear shaft 43 may extend through a housing wall 24 and be retained thereto via a clip 44. Also visible are portions of the headed shafts 26, 27, and portions of a detent 38 and the arm lock 25 extending through the housing wall 24.

Also, the operator 20 may include the detent 38 to releasably restrain the lever 22 (FIG. 5) in the home position. In the illustrated embodiment, the detent 38 may include a separate component carried by the housing 21 and having a projection 52 extending through a corresponding aperture 39 in the housing wall 24 and into the recess 17 in which the lever 22 is carried for cooperation with the lever 22. In particular, the detent 38 may releasably restrain the lever 22 (FIG. 5) in its home position in the recess 17 of the housing 21.

Figure 7:
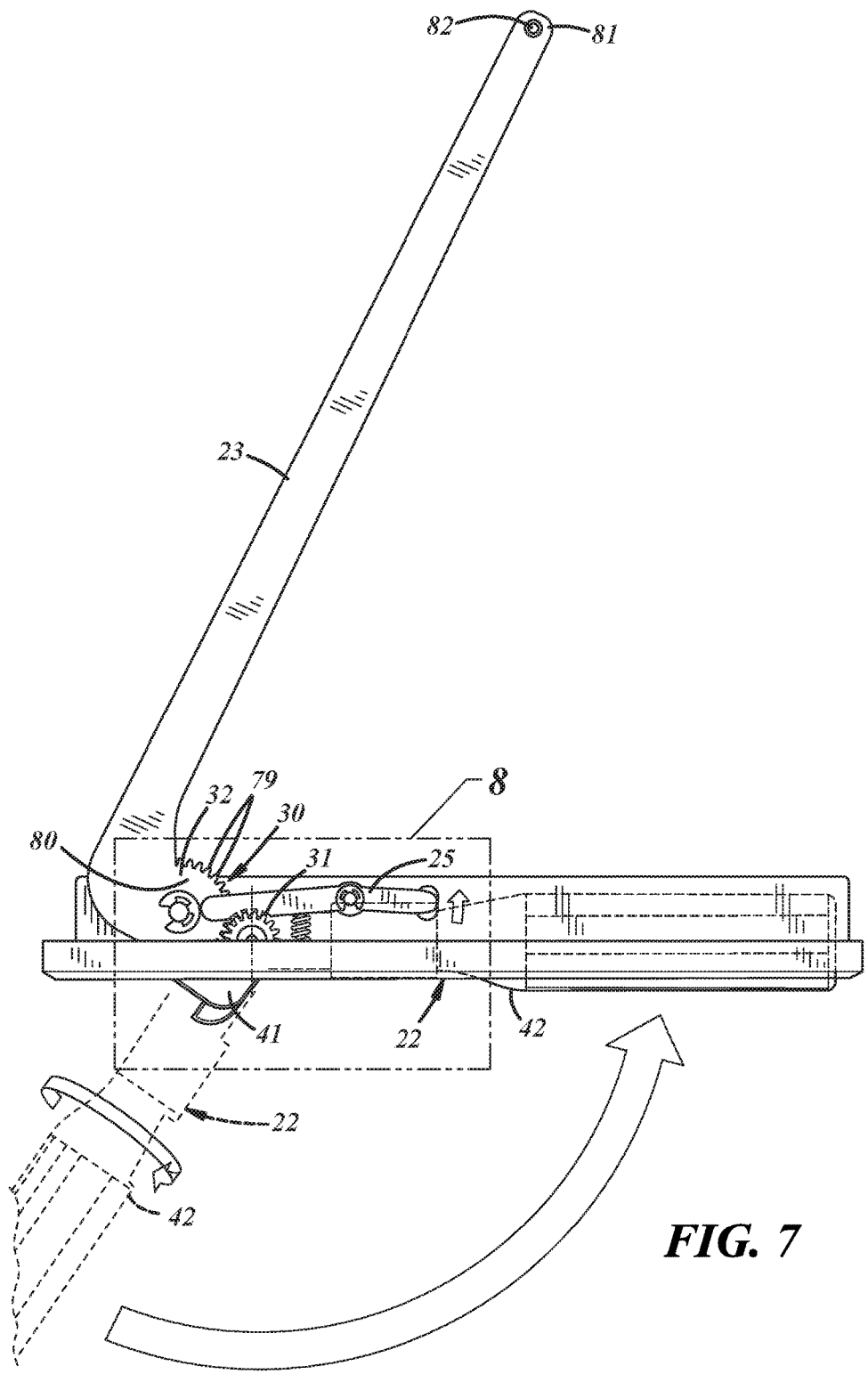
FIG. 7 is a top view of the building closure operator of FIG. 1, illustrating the arm in the open position and the lever coupling in its actuated position, but illustrating the lever handle rotated back to its home position and, thus, further illustrating the arm lock engaged with the input gear of the geartrain to lock the operator arm in the open position.
Figure 8:
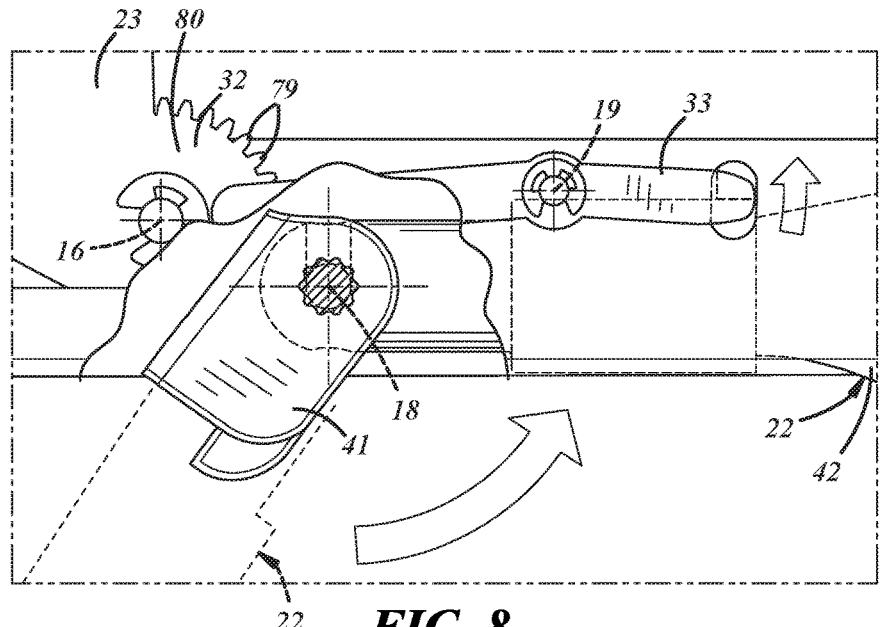
FIG. 8 is an enlarged top view of the building closure operator of FIG. 7, taken from box 8 of FIG. 7.

With reference to FIGS. 7 and 8, the operator arm 23 is illustrated in the open position and the lever 22 is illustrated (in solid lines) in an actuated and locked position, wherein the lever coupling 41 is in its actuated position, but the lever handle 42 has been rotated back to its home position and, thus, the arm lock 25 is in a locked or engaged position with respect to the input gear 31 of the geartrain 30 to lock the arm 23 in the open position. Those of ordinary skill in the art will understand that the illustrated open position is just one of many open positions and is not necessarily a fully opened position.

The arm 23 may include gear teeth 79 in a sector gear portion 80 proximate the arm pivot axis, which may be established by a hole extending through the arm. Also, the arm 23 may include a closure end 81 oppositely disposed from the sector gear portion 80 and carrying a post 82 or any other coupling feature(s) suitable for coupling to a building closure.

Figure 9:
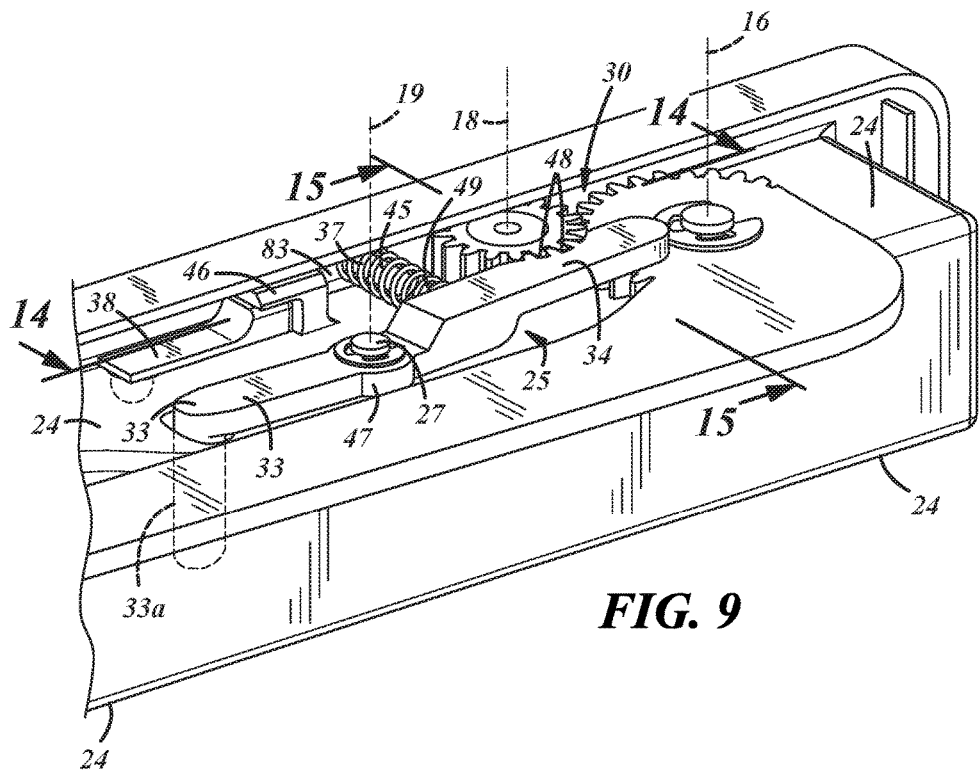
FIG. 9 is an enlarged, fragmentary, rear perspective view of the building closure operator of FIG. 1.

With reference to FIG. 9, a spring post 45 for locating the spring 37 and a retainer 46 for retaining the detent 38 can be seen. The spring post 45 may extend from a housing flange 83 extending from the housing wall 24, and the retainer 46 may be L-shaped and extending from the housing wall 24.

Also, the arm lock 25 may include a laterally extending body 47, and the headed shaft 27 extending through a corresponding passage through the body 47. The arm lock 25 also includes the actuator portion 33 that may extend axially away from the body 47, and the lock portion 34 disposed on a side of the lock arm pivot axis 19 opposite that of the actuator portion 33. The lock portion 34 may include one or more teeth 48 or engagement features to engage the geartrain 30. Also, the lock 25 may include a post 49 or other spring locating feature to cooperate with the spring 37 to locate the spring 37 with respect to the lock 25.

Figure 10:
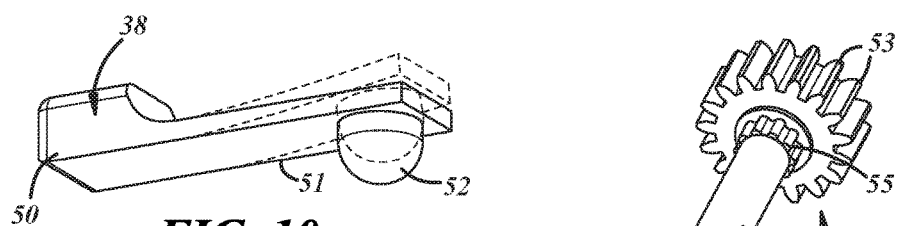
FIG. 10 is a perspective view of the detent shown in FIG. 4.

With reference to FIG. 10, the detent 38 may be cantilevered, and may include a base portion 50 for coupling to the housing 21, a deflection arm 51 extending away from the base portion 50 along a longitudinal axis and that may have a transverse cross-sectional area smaller than that of the base portion 50, and the projection 52 carried proximate the end of the arm 51 for cooperating with the lever 22.

Figure 11:
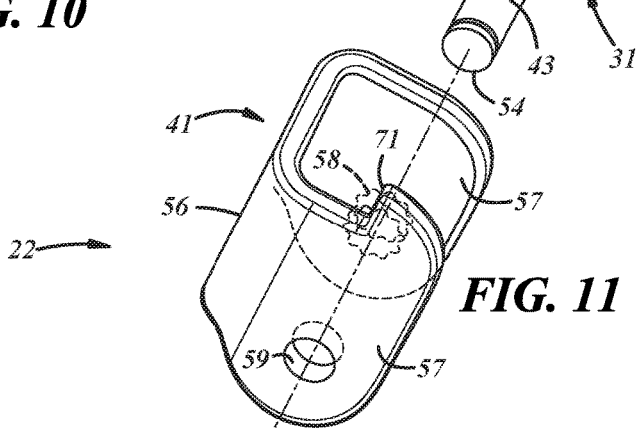
FIG. 11 is an exploded perspective view of the input gear shown in FIG. 4 and the lever coupling shown in FIG. 6B.

With reference to FIG. 11, the input gear 31 may include gear teeth 53 at one end, the input gear shaft 43, a shaft end 54 at another end, and a spline 55 therebetween and proximate the gear teeth 53 for rotational affixation to the lever 22 as described further herein below. The spline 55 instead may be replaced by a key, keyway, flat(s), or any other features for rotational affixation to the lever 22.

Also, and with additional reference to FIG. 11, the lever 22 includes the lever coupling 41, which may include a base wall 56 and axially spaced apart flanges 57 extending away from the base wall 56, for accepting the shaft 43 of the input gear 31 therethrough, and being fixed to a portion of the input gear 31 so as to pivot therewith. For instance, one of the flanges 57 may include a splined aperture 58 to cooperate with the spline 55 of the input gear 31, and the other of the flanges 57 may include a round aperture 59 to accept the shaft end 54 therethrough. Instead of using splines, the coupling 41 may be rotationally affixed, or fixed against relative rotation, to the input gear via keys, flats, or in any other suitable manner.

Figure 12:
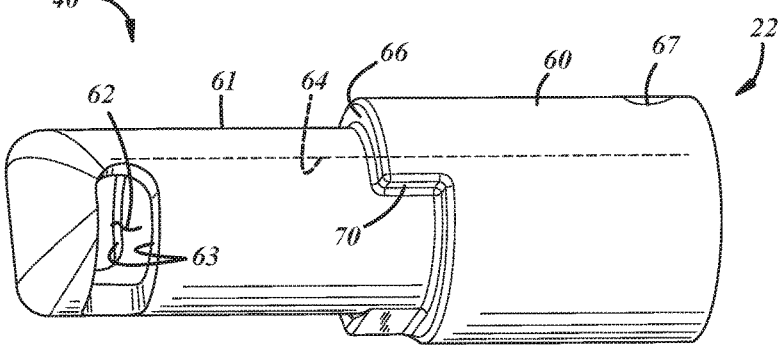
FIG. 12 is a perspective view of a portion of the lever shown in FIG. 3.

Further, with additional reference to FIG. 12, the lever 22 may include a coupling portion 40 that may include a collar 60 and a barrel 61 extending axially away from the collar 60 and establishing a semi-spherical pocket 62 and having diametrically opposed, circumferentially extending slots 63 through which the input gear shaft 43 (FIG. 11) extends. The collar 60 may be larger in radial extent than the barrel 61, and the coupling portion 40 may include a bore 64 and a locating shoulder 66. The collar 60 also may include a detent recess 67 therein.

With additional reference to FIGS. 11 and 12, the collar 60 may include an axially extending, circumferentially facing shoulder 70, for instance, an L-shaped step in the collar 60. Correspondingly, one of the lever coupling flanges 57 may include an extension 71 to cooperate with the lever handle shoulder 70 to allow the lever coupling 41 to be pivoted toward the home position when the lever handle 42 is pivoted toward the home position. Also, the lever handle 42 may be rotatable with respect to the lever coupling 41 to circumferentially displace the shoulder 70 away from the extension 71 and thereby allow pivoting of the lever handle 42 with respect to the lever coupling 41.

Figure 13:
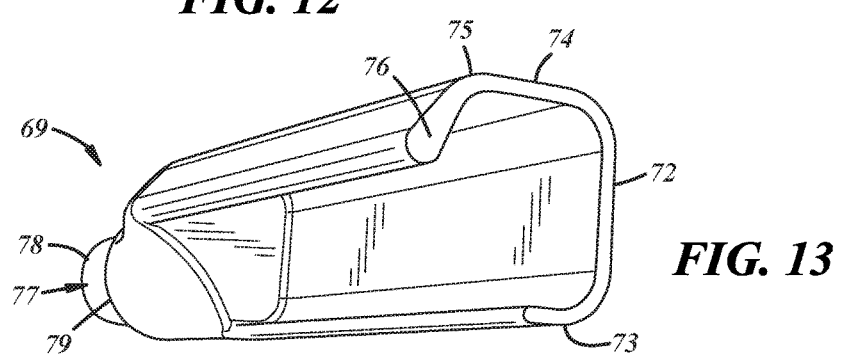
FIG. 13 is a perspective view of another portion of the lever shown in FIG. 3.

With reference to FIGS. 12 and 13, the lever handle 42 may include multiple separate pieces, which may include the coupling portion 40 of FIG. 12 and a grip portion 69 of FIG. 13, that may be coupled together with a screw or other fastener, and/or may be integrally fastened, adhered, welded, or otherwise coupled in any other suitable manner. In any event, the grip portion 69 may include a base wall 72, a first flange 73 extending from one end of the base wall 72, and a second flange 74 extending from an opposite end of the base wall 72 and having a bend 75 and a downturned free end 76 for cooperation with a user's fingers. The free end 76 may be thicker than other portions of the second flange 74. The grip portion 69 also may include a boss 77 for insertion into the collar 60 of the coupling portion 40 of the handle 42. (FIG. 12) A free end 78 of the boss 77 may locate against an internal surface of the shoulder 66 of the collar 60 of the coupling portion 40 of the lever 22, and/or a shoulder 79 of the boss 77 may locate against a corresponding end of the coupling portion collar 60. Also, the boss 77 may include a fastener passage (not shown) extending transversely therethrough for receiving a fastener that may fasten the coupling portion 40 of the handle 42 to the grip portion 69 of the handle 42.

FIGS. 14 and 15 illustrate the articulation coupling 40 of the lever 22 through which the shaft 43 of the input gear 31 extends. The shaft 43 also extends through the housing walls 24. The articulation coupling 40 also may include a spherical bearing 68 carried in the semi-spherical pocket 62 of the barrel 61 and having a passage 86 through which the input gear shaft 43 extends to facilitate pivoting of the handle 42 with respect to the lever coupling 41. The spherical bearing 68 may include opposed ends 84, a circumferentially continuously extending semi-spherical sidewall 85, and the through passage 86 between the ends 84, through which the input gear shaft 43 may extend. With reference to FIG. 15, the slots 63 in the barrel 61 have corresponding slot ends 63a, 63b that establish the limits of rotation of the lever 22 about its own longitudinal axis.

In accordance with the above described embodiments, an illustrative method of pivoting a building closure operator arm 23 about an arm pivot axis 16, may include the following steps: pivoting a lever 22 about a lever axis 18 parallel to the arm pivot axis 16, away from a lever home position to a lever actuated position so as to pivot the building closure operator arm 23 away from an arm closed position to an arm open position; and articulating the lever 22 so that a handle 42 of the lever 22 is movable back to the home position to actuate an arm lock 25 that locks the arm 23 in the arm open position.

The articulating step may include rotating the lever handle 42 about its own longitudinal axis to release the lever handle 42 from a separate lever coupling 41 of the lever 22, and pivoting the lever handle 42 back to the home position to actuate the arm lock 25 that locks the arm 23 in the arm open position.

In general, the components of the operator 20 can be manufactured according to techniques known to those skilled in the art, including molding, machining, stamping, and the like. Also, the operator 20 can be assembled according to known techniques, including manual and/or automatic assembly. Likewise, any suitable materials can be used in making the components, for example, metals, composites, polymeric materials, and the like.

The present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Moreover, features of various implementing embodiments may be combined to form further embodiments of the invention. Therefore, the claimed invention is not limited to the particular examples of illustrative embodiments disclosed herein.

The invention claimed is:

1. A building closure operator, comprising:
    an operator arm pivotable about an arm axis from an arm closed position to an arm open position;
    an arm lock actuatable to lock the arm in different locked positions and releasable to release the arm; and
    an articulatable lever pivotable about a lever axis, from a lever home position corresponding to the arm closed position, to a lever actuated position corresponding to the arm open position, and including:
        a lever coupling maintainable in the lever actuated position, and
        a lever handle pivotable with respect to the lever coupling in the lever actuated position of the lever coupling back to the home position to actuate the arm lock to lock the arm in one of the different locked positions.

2. The operator of claim 1, wherein the lever coupling is pivotable about the lever axis, and the lever handle is rotatably coupled to the lever coupling about a longitudinal handle axis and is foldably coupled to the lever coupling, to allow rotating and folding of the lever handle back to the home position.

3. The operator of claim 1, further comprising:
a geartrain operatively coupled between the lever and the arm to apply mechanical advantage therebetween.

4. The operator of claim 3, wherein the arm lock is engageable with the geartrain to lock the arm in different locked positions and is disengageable from the geartrain to release the arm.

5. The operator of claim 4, wherein the arm lock includes a pivot axis about which the arm lock is pivotable, an actuator portion to cooperate with the lever, and a lock portion disposed on a side of the pivot axis opposite that of the actuator portion to engage the geartrain.

6. The operator of claim 3, wherein the geartrain includes an output gear at a sector gear end of the operator arm.

7. The operator of claim 3, wherein the geartrain includes an input gear rotationally fixed to the lever.

8. The operator of claim 7, wherein the lever coupling includes a base wall, and axially spaced apart flanges extending away from the base wall, accepts a shaft of the input gear therethrough, and is fixed to a portion of the input gear so as to pivot therewith.

9. The operator of claim 8, wherein the lever handle includes a barrel establishing a semi-spherical pocket and having diametrically opposed, circumferentially extending slots through which the input gear shaft extends.

10. The operator of claim 9, wherein the lever also includes a spherical bearing carried in the semi-spherical pocket and having a passage through which the input gear shaft extends to facilitate pivoting of the handle with respect to the lever coupling.

11. The operator of claim 8, wherein the lever handle includes an axially extending, circumferentially facing shoulder and one of the flanges includes an extension to cooperate with the shoulder of the lever handle to allow the lever coupling to be pivoted toward the home position when the lever handle is pivoted toward the home position.

12. The operator of claim 11, wherein the lever handle is rotatable with respect to the lever coupling to circumferentially displace the shoulder away from the extension and thereby allow pivoting of the lever handle with respect to the lever coupling.

13. The operator of claim 1, further comprising:
a spring to bias the arm lock to a release position thereof.

14. The operator of claim 1, further comprising:
a detent to releasably restrain the lever in the home position.

15. The operator of claim 1, further comprising:
a housing including opposed walls spaced apart in a direction along the arm axis, wherein the articulatable lever is pivotably mounted internally between the opposed walls and the operator arm and the arm lock are carried externally on one of the opposed walls.

16. A window frame assembly, comprising:
a frame; and
the operator of claim 15, wherein the housing is carried by the frame and the operator arm includes a closure end coupled to the closure.

17. A window assembly, comprising:
the window frame assembly of claim 16; and
a closure pivotably carried by the frame.

18. A method of pivoting a building closure operator arm about an arm pivot axis, comprising the steps of:
carrying a lever with respect to a housing, wherein the lever is locatable in a lever home position with respect to the housing;
pivoting the lever about a lever axis, away from the lever home position to a lever actuated position with respect to the housing, so as to pivot the building closure operator arm away from an arm closed position to an arm open position of the building closure operator arm; and
articulating the lever so that a handle of the lever is movable back to the home position to engage and actuate an arm lock that locks the building closure operator arm in the arm open position.

19. The method of claim 18, wherein the articulating step comprises:
rotating the lever handle about its own longitudinal axis to release the lever handle from a separate lever coupling of the lever, and
pivoting the lever handle back to the home position to actuate the arm lock that locks the arm in the arm open position.

20. A method of pivoting a building closure operation arm about an arm pivot axis, comprising the steps of:
pivoting a lever about a lever axis, away from a lever home position to a lever actuated position so as to pivot the building closure operator arm away from an arm closed position to an arm open position; and
articulating the lever so that a handle of the lever is movable back to the home position to actuate an arm lock that locks the arm in the arm open position, wherein the method is carried out using a building closure operator, comprising:
the operator arm;
an arm lock actuatable to lock the arm in different locked positions and releasable to release the arm; and
an articulatable lever pivotable about the lever axis, from the lever home position corresponding to the arm closed position, to the lever actuated position corresponding to the arm open position, and including:
a lever coupling maintainable in the lever actuated position, and
a lever handle pivotable with respect to the lever coupling in the lever actuated position of the lever coupling back to the home position to actuate the arm lock to lock the arm in one of the different locked positions.

* * * * *